United States Patent [19]
Mesnel

[11] 3,803,766
[45] Apr. 16, 1974

[54] SEALING ARRANGEMENT FOR VEHICLE DOORS

[75] Inventor: Francois Pierre Mesnel, Neuilly-sur-Seine, France

[73] Assignee: Establissements Mesnel, Bellevue, France

[22] Filed: Apr. 28, 1972

[21] Appl. No.: 248,732

[52] U.S. Cl............................ 49/484, 49/493, 52/11
[51] Int. Cl................................................ E04b 1/66
[58] Field of Search....... 52/11, 399, 400, 401, 403, 52/718, 716, 208, 393, 97, 397, 717; 49/493, 496, 497, 491, 498, 484; 296/93

[56] References Cited
UNITED STATES PATENTS

| | | | |
|---|---|---|---|
| 2,536,863 | 1/1951 | Widman | 49/493 |
| 3,323,256 | 6/1967 | Reahard | 49/493 |
| 1,966,641 | 7/1934 | Newill | 49/497 |
| 2,994,555 | 8/1961 | McClure | 49/493 |
| 2,733,096 | 1/1956 | Waterhouse | 296/146 |
| 1,908,839 | 6/1933 | Greig | 49/493 |

FOREIGN PATENTS OR APPLICATIONS
1,075,302  7/1967  Great Britain........................ 52/716

Primary Examiner—Alfred C. Perham
Assistant Examiner—Mark H. Wolk
Attorney, Agent, or Firm—Raymond A. Robic; Arthur Schwartz

[57] ABSTRACT

A sealing arrangement between a vehicle door and its frame comprises an inner seal, mounted on the frame and engageable by an inner part of the closed door, and an outer seal mounted on a guttering of a roof of the vehicle and engaged by an outer flange of the closed door, the outer seal comprising a first member shaped to hook over the guttering and supporting a second member of resilient material which contacts and seals with the outer flange, the outer seal prevents air entering between it and the inner seal and so reduces wind noise when the vehicle is travelling at high speeds as well as reducing the likelihood of water entering the vehicle via the door.

11 Claims, 5 Drawing Figures

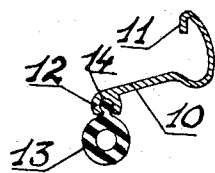
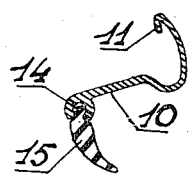
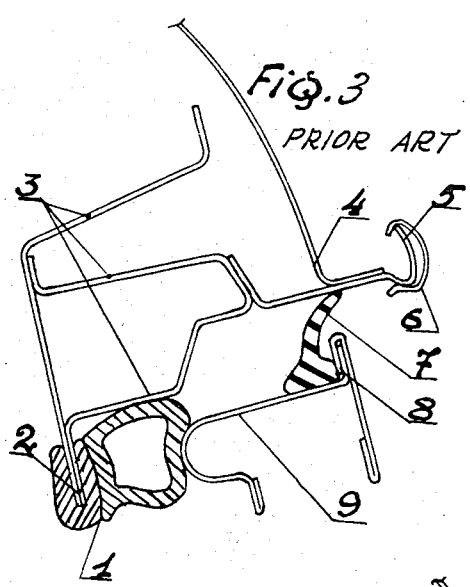
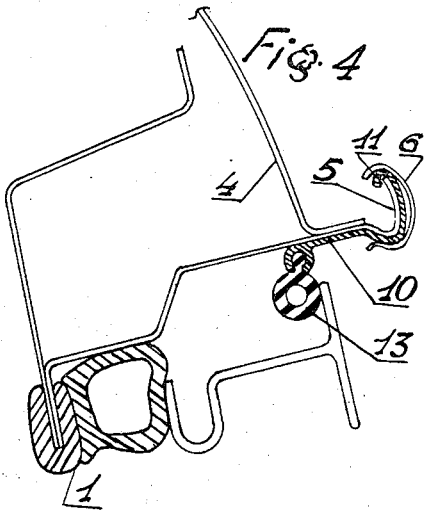
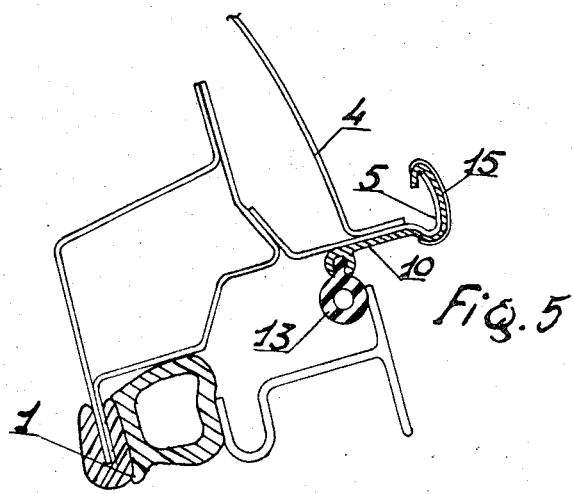

SEALING ARRANGEMENT FOR VEHICLE DOORS

This invention relates to a sealing arrangement for a vehicle door, particularly for the top edge of a vehicle door.

There are known arrangements which are intended to ensure sealing between frames and doors of vehicles. These are each usually constituted by a U-shaped metal member around which is extruded a joint body which serves to fix the inner side on the edge of a sheet, whilst used in combination with this joint is a sealing element in the form of a lip or an elastically deformable tube. It is also known to provide double sealing towards the exterior of the door by adhering under the outer flange of the door a second sealing member which can be extruded so as to form a second contact lip with the frame. These known sealing arrangements however have, owing to ineluctable contact faults of this second sealing member, the disadvantage that there are formed air-circulation corridors which produce unpleasant whistlings at high speed.

An object of the present invention is to provide a sealing arrangement, for the top of a vehicle door, by which the above disadvantage can be obviated or minimised.

Accordingly the invention provides a sealing arrangement, between a door of a vehicle and a frame thereof, comprising an inner seal mounted on the frame and, when the door is closed, engaging an inner peripheral part of the door and an outer seal, mounted on a guttering of a roof of the vehicle, and, when the door is closed, engaging an outer flange of the door, the outer seal comprising a first member made from material which is flexible but rigid enough to be self-supporting and which has a clip portion whereby it is hooked onto the guttering, and a second member which is attached to the first member and which is of resilient material and is engaged by the outer flange of the door when the door is closed.

The invention will be described further, by way of example, with reference to the accompanying drawings, wherein:

FIG. 1 is a cross-section through a component of the sealing arrangement of FIG. 4;

FIG. 2 is a cross-section through a modified form of component which can be used in the sealing arrangement of FIG. 4;

FIG. 3 is a cross-section through a conventional sealing arrangement between a top of a vehicle door and its frame;

FIG. 4 is a cross-section through a preferred embodiment of sealing arrangement conforming to the invention; and FIG. 5 is a view similar to that of FIG. 4 but illustrating a modified sealing arrangement.

FIG. 3 illustrates a conventional sealing arrangement at the top of a door of a vehicle such as a car. The vehicle has a door framework 3 which is attached, at the top, to the roof 4 of the vehicle. The edge of the sheet of metal forming the roof 4 is bent over to form a guttering or weathering 5. The guttering 5 is provided with a trim strip 6. The sealing arrangement is constituted by two seals, a first seal 1 which is attached to an edge 2 of the framework 3 and which, when the door 9 is closed, abuts and seals with an inner part thereof, and a second seal 7 which is attached to the door 9 and which, when the door 9 is closed, seals with a part of the frame 3. This arrangement, however, still leaves various cavities which, when the vehicle is moving at high speed, can be sources of wind noise.

A preferred embodiment of sealing arrangement conforming to the invention is illustrated in FIG. 4. It will be seen that in the arrangement of the invention the second seal 7 has been replaced by the component illustrated in FIG. 1.

This component comprises a first section 10 of comparatively rigid but still flexible and deformable plastics material, which is rigid enough to be self-supporting and is formed with a clip portion 11 to facilitate hooking of the section 10 over the guttering 5. At its other free edge this section 10 is formed with a longitudinally extending recess 12. The clip 11 is generally C-shaped in cross-section and an upper part of the C is turned over to form a lip which engages over the edge of the guttering 5. The component also comprises a second section 13, which is tubular and of a resilient material. Section 13 can be extruded from elastomeric material, or made from foamed material. Section 13 comprises a longitudinally extending bead 14 by means of which it is attached to the member 12, the bead 14 engages in and is a press fit in or is adhered to the recess 12.

FIG. 2 illustrates a modified form of component which can be incorporated in the sealing arrangement of FIG. 4. This component is different from that of FIG. 1 only in that the section 15 thereof, which is of the same material as section 13, is not tubular but is, in cross-section, of half-crescent shape. It engages recess 12 in the same manner as the section 13. The sections 13 and 15 can be cross-sections other than those illustrated. The cross-section chosen will depend, of course, on the particular application or mode of use of the sealing arrangement.

Referring again briefly to FIG. 4 it will be seen that a trim strip 6 can be attached so as to overlay the clip 11 of section 10 more firmly to unite it with guttering 5 and to improve the appearance of the vehicle.

Fig. 5 illustrates a modification of the arrangement of Fig. 4 which differs from that of FIG. 4 only in that there is substituted for the trim strip 6 a decorative band 15 of plastics material of the same shape as trim strip 6. The band can be of metallized aceto-butyrate, or of cellulose.

The invention is not limited to the details of the above described embodiment and modification and variations can be made thereto within the scope of the following claims. For example the decorative band 15 can be dispensed with and there can alternatively be effected a direct nickel-plating or chromium-plating of the clip part 11 of the section 10 provided that the section 10 is made from a material suitable for such a treatment, for example polyacrylonitrile butadiene styrene, known as A.B.S.

The plastic section 10 can be self-coloured so as to obviate the need for the trim strip 6 or 15. The section 10 can, also be subjected to any surface treatment which enhances its appearance.

The decorative band 15 can be made from polyterephthalate of ethylene-glycol such as that material known as Mylar.

I claim:

1. In a vehicle having a door with an inner peripheral portion and an outer flange, the door cooperating with a frame, a sealing arrangement attached to a gutter on the roof of the vehicle comprising:

a. an inner seal mounted on the frame, said inner seal engaging the inner peripheral portion of the door when the door is closed;
b. an outer seal mounted on the gutter of the roof of the vehicle and engaging the inside of an outer flange of the door when the door is closed;
c. said outer seal comprising:
   1. a first member of flexible material having a sufficient rigidity to be self-supporting,
   2. said first member including a clip means for hooking onto the gutter, and
   3. a second member attached to said first member, said second member being of resilient material and engaging the inside of the outer flange of the door when the door is closed.

2. An arrangement as claimed in claim 1, wherein the clip means is generally C-shaped in cross-section and, one end being turned over to form a clip which engages over the edge of the gutter.

3. An arrangement as claimed in claim 1, wherein the first member, where it is secured to the gutter, is overlaid by a trim strip which fastens the first member more securely and which improves the appearance thereof.

4. An arrangement as claimed in claim 1, wherein the first member, where it is secured to the gutter, is overlaid by a trim strip of plastic material.

5. An arrangement as claimed in claim 4, wherein the trim strip is made from acetobyturate of cellulose.

6. An arrangement as claimed in claim 1, wherein the said first member is made from a material which can be coated directly with a metal, by electrolytic action, such as polyacrilonitrile butadiene styrene.

7. An arrangement as claimed in claim 1, wherein the first member has a longitudinal recess extending along that edge thereof remote from the clip means and a complementary longitudinal rib is formed on the second member, the recess receiving the rib whereby the two sections are united.

8. An arrangement as claimed in claim 7, wherein the rib is press fit in the recess.

9. An arrangement as claimed in claim 7, wherein the rib is adhered in the recess.

10. An arrangement as claimed in claim 1, wherein the second member is of generally tubular configuration.

11. An arrangement as claimed in claim 1, wherein the second member is made from foamed plastics material.

* * * * *